United States Patent
Fan et al.

(10) Patent No.: US 9,697,182 B2
(45) Date of Patent: Jul. 4, 2017

(54) METHOD AND SYSTEM FOR NAVIGATING A HARD COPY OF A WEB PAGE

(71) Applicant: Xerox Corporation, Norwalk, CT (US)

(72) Inventors: Zhigang Fan, Webster, NY (US); Lee Coy Moore, Penfield, NY (US); Yonghui Zhao, Cupertino, CA (US); Phillip J. Emmett, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 374 days.

(21) Appl. No.: 13/710,804

(22) Filed: Dec. 11, 2012

(65) Prior Publication Data
US 2014/0164891 A1    Jun. 12, 2014

(51) Int. Cl.
G06F 17/22 (2006.01)
G06F 17/30 (2006.01)
H04N 1/00 (2006.01)
H04N 1/32 (2006.01)

(52) U.S. Cl.
CPC .... G06F 17/2235 (2013.01); G06F 17/30864 (2013.01); H04N 1/00204 (2013.01); H04N 1/00968 (2013.01); H04N 1/32133 (2013.01); H04N 2201/0084 (2013.01); H04N 2201/3249 (2013.01)

(58) Field of Classification Search
None
See application file for complete search history.

(56) References Cited

U.S. PATENT DOCUMENTS

| | | | |
|---|---|---|---|
| 6,177,936 B1 * | 1/2001 | Cragun | 715/760 |
| 6,820,236 B1 * | 11/2004 | Bates et al. | 715/236 |
| 7,565,139 B2 | 7/2009 | Neven, Sr. et al. | |
| 7,599,580 B2 | 10/2009 | King et al. | |
| 7,668,814 B2 * | 2/2010 | Il | 707/760 |
| 7,751,805 B2 | 7/2010 | Neven et al. | |
| 7,797,447 B1 | 9/2010 | Schilit et al. | |
| 7,962,128 B2 | 6/2011 | Neven et al. | |
| 8,436,911 B2 * | 5/2013 | Leebow | 348/222.1 |
| 2004/0044747 A1 | 3/2004 | Trevor et al. | |
| 2004/1004955 | 3/2004 | Schilit et al. | |
| 2005/0097080 A1 * | 5/2005 | KethiReddy et al. | 707/3 |
| 2005/0185060 A1 | 8/2005 | Neven, Sr. | |
| 2007/0047002 A1 * | 3/2007 | Hull et al. | 358/3.28 |
| 2010/0250547 A1 | 9/2010 | Grefenstette et al. | |
| 2011/0123115 A1 * | 5/2011 | Lee | G06K 9/036 382/185 |
| 2011/0153653 A1 | 6/2011 | King et al. | |

* cited by examiner

Primary Examiner — Stephen Hong
Assistant Examiner — Hope C Sheffield
(74) Attorney, Agent, or Firm — Fay Sharpe LLP (57) ABSTRACT

This disclosure provides a method and system for navigating hard copies of web pages. According to one exemplary method, a hard copy of a web page is navigated by capturing with a mobile device an image of the hard copy, performing OCR on the captured image to identify the captured web page, accessing a database to retrieve a copy of the identified web page and displaying the retrieved copy of the identified web page along with active web page links on the mobile device.

18 Claims, 5 Drawing Sheets

METHOD AND SYSTEM FOR NAVIGATING A HARD COPY OF A WEB PAGE

BACKGROUND

The Internet, fueled by the popularity of the Web, has exhibited significant growth over the past few years. At present, to access the information on the Web, users typically use standard computer equipment, such as a home personal computer with a display and modem, and an Internet connection.

There have been efforts to expand the number of users and the ease with which they access the Internet. For example, several companies have developed television set-top boxes that permit users to browse or "surf" the Internet from their television sets. In addition, communication companies have joined with software developers to allow mobile communication devices such as cellular telephones, pagers, smart phones and personal digital assistants to access some features of the Internet.

Presently, several types of Internet connections are available. For example, to use an Internet connection from Internet Service Providers (ISPs), the user communicates with a computer at the ISP's facility using a modem and standard telephone line or broadband cable. The ISP's computer in turn provides the user with access to the Internet. Through this Internet connection, the user can access information on the Web using a computer program called a "Web browser." The Web browser is a software program that allows a user to view the data received from an Internet site location. To accomplish this, the user gives the Web browser a Uniform Resource Locator (URL) for an object on the Internet, for example, a data file containing information of interest. The document is referred to as a "Web page," and the information contained in the Web page is called content. Web pages often refer to other Web pages using "hypertext links", also referred to as "hyper-links", or simply as "links". The links are typically associated with words, phrases, or images representing the other pages in a form that gives the browser the URL for the corresponding Web page when the user selects a link.

Links are made possible by building Web pages using a Hypertext Markup Language (HTML), an evolving markup language standard which is used to construct documents in a uniform, standardized format so they may be accessed by Web browsers and displayed for the user. HTML is an ASCII text-based markup language which defines page or frame formats used to display the HTML elements. To provide the hypertext linking, most documents contain "anchor" words, phrases or images. The anchors serve as visible starting points for links. The anchor, or the HTML <A> element, includes a URL that uniquely identifies the endpoint of the link, or the destination document or Web page that will be activated when the link is selected.

Once the user selects a URL for a site either directly or through a link, the URL can be used to identify a specific host computer on the Internet called a "Web Server," along with a location of the Web page located on the Web Server. The Web browser retrieves the Web page and displays it for the user.

Hypertext Transfer Protocol (HTTP) is a common network protocol used by the browser to access and link users with various other Web pages or sites referenced by the original Web page. HTTP requires a program running on the host computer that understands and responds to the protocol or formatting of the link's content. The file retrieved might be, for example, an HTML file, a graphics file, a sound file, a PowerPoint™ file, or a word processing file. Whether the file can be retrieved or handled depends on the features and capabilities of the browser.

When a browser requests a specific URL, it sends the request to the Web server. The Web server receives the request and attempts to fill it. There are several ways the user requests can be filled. For example, Web servers can translate a request such as "http://www.recipes.com/recipes/soup.htm" into a search for a physical file on that server. It would start from the base category for the domain and then apply the path that was requested. In this example, the Web server would look for a category called "recipes" and then look for a file called "soup.htm" within that category. If the file was found it would be passed back, without modification, to the requesting browser. In this way, the URL can be thought of as a specific file sitting on a server, or host computer.

HTML can be translated from other standard generalized markup languages, such as Wireless Markup Language (WML). WML was developed by the Wireless Application Protocol (WAP) Forum, which was founded by ERICSSON®, MOTOROLA®, NOKIA® and UNWIRED PLANET®. WML was developed as a global wireless protocol specification intended for use in specifying content and user interface for narrowband devices, including cellular telephones and pagers, to allow users mobile access to the resources of the Internet. WML is based on XML (extensible Markup Language).

While computer terminals and other devices that are configured to receive HTTP signals and HTML files may utilize the above methods to access and view internet data, sometimes a web page is printed as a hard copy for display purposes or as a handout and the web page loses its control information and cannot be navigated. For example, a conference organizer may print web pages including the conference schedule and distribute them to the attendees, and/or displayed on a poster. Once the conference schedule web page is printed, the web page loses its control information and the viewers cannot navigate the web page.

This disclosure provides a method and system for navigating a hard copy of a web page.

INCORPORATION BY REFERENCE

U.S. Patent Publication No. 2004/0044747, published Mar. 4, 2004, by Trevor et al., entitled "Link Navigator Method And System For Locating Web Content";

U.S. Patent Publication No. 2004/0049555, published Mar. 11, 2004, by Schilit et al., entitled "Service Portal For Links From Web Content";

U.S. Patent Publication No. 2005/0185060, published Aug. 25, 2005, by Neven, S R., entitled "Image Base Inquiry System For Search Engines For Mobile Telephones With Integrated Camera";

U.S. Patent Publication No. 2010/0250547, published Sep. 30, 2010, by Grefenstette et al., entitled "System For Automatically Generating Queries";

U.S. Patent Publication No. 2011/0153653, published Jun. 23, 2011, by King et al., entitled "Image Search Using Text-Based Elements Within The Contents Of Images";

U.S. Pat. No. 7,962,128, issued Jun. 14, 2011, by Neven et al., entitled "Mobile Image-Based Information Retrieval System";

U.S. Pat. No. 7,797,447, issued Sep. 14, 2010, by Schilit et al., entitled "Data Detector For Creating Links From Web Content For Mobile Devices";

U.S. Pat. No. 7,751,805, issued Jul. 6, 2010, by Neven et al., entitled "Mobile Image-Based Information Retrieval System";

U.S. Pat. No. 7,565,139, issued Jul. 21, 2009, by Neven, Sr. et al., entitled "Image-Based Search Engine For Mobile Phones With Camera";

U.S. Pat. No. 7,599,580, issued Oct. 6, 2009, by King et al., entitled "Capturing Text From Rendered Documents Using Supplemental Information", are incorporated herein by reference in their entirety.

BRIEF DESCRIPTION

In one embodiment of this disclosure, described is a computer-implemented method of navigating a hard copy of a web page comprising A) a user capturing an image of a web page hard copy using a computer device including an image capturing device, a display and a user interface; the captured image including one or more text strings which provide dormant links to other web pages; B) performing OCR (optical character recognition) on the captured image to produce a text searchable version of the captured image; C) searching a database for one or more portions of text associated with the text searchable version of the captured image, the database including text searchable versions of a plurality of electronic copies of web pages retrieved from one or more web servers including a copy of the web page hard copy, each text searchable version of the plurality of electronic copies of web pages including control information which links one or more text strings contained in the plurality of electronic copies of web pages of other linked copies of web pages; D) retrieving the control information associated with the captured web page; and E) displaying on the computer display a processed image of the web page hard copy, the processed image including the retrieved control information associated with the web page hard copy and the processed image includes an appearance of one or more text strings associated with the web page hard copy which are linked to one or more other electronic copies of web pages retrieved from one or more web servers, the appearance indicating the one or more text strings are active.

In another embodiment of this disclosure, described is a web page hard copy navigation system comprising a computer device including an image capturing device, a display and a user interface, the computer device configured to capture an image of a web page hard copy; a database operatively connected to the computer device, the database configured to store a plurality of web page electronic copies retrieved from one or more web servers, the plurality of web page electronic copies including control information which links text strings contained in the web page electronic copies to other web page electronic copies; a server operatively connected to the computer device and the database, the server configured to search the database for an electronic copy of a captured image of a web page hard copy, retrieve the electronic copy of the web page hard copy associated with the captured image including any control information, and communicating the retrieved electronic copy of the web page hard copy associated with the captured image to the computer device, the communicated retrieved electronic copy including a processed image of the web page hard copy, the processed image including the retrieved control information associated with the retrieved electronic copy of the web page hard copy, the processed image including an overlay on the captured image which modifies an appearance of one or more text strings associated with the web page hard copy which are linked to one or more other electronic copies of web pages indicating the one or more text strings are active.

In still another embodiment of this disclosure, described is a computer program product comprising a non-transitory computer-usable data carrier storing instructions that, when executed by a computer, cause the computer to perform a method comprising: A) capturing an image of a web page hard copy using a computer device including an image capturing device, a display and a user interface; the captured image including one or more text strings which provide dormant links to other web pages; B) performing OCR (optical character recognition) on the captured image to produce a text searchable version of the captured image; C) searching a database for one or more portions of text associated with the text searchable version of the captured image, the database including text searchable versions of a plurality of electronic copies of web pages retrieved from one or more web servers including a copy of the web page hard copy, each text searchable version of the plurality of electronic copies of web pages including control information which links one or more text strings contained in the plurality of electronic copies of web pages of other linked copies of web pages; D) retrieving the control information associated with the captured web page; and E) displaying on the computer display a processed image of the web page hard copy, the processed image including the retrieved control information associated with the web page hard copy and the processed image includes an appearance of one or more text strings associated with the web page hard copy which are linked to one or more other electronic copies of web pages retrieved from one or more web servers, the appearance indicating the one or more text strings are active.

DETAILED DESCRIPTION

This disclosure provides an augmented reality method and system that allows for real-time hardcopy navigation of a web page. The system includes five components: 1) a database, 2) digital camera, 3) search engine, 4) scene generation engine, and 5) UI (user interface). Benefits of the disclosed method and system include recreating functional documents after printing in a realistic setting such as a conference setting. As previously discussed in the Background section, a web page may sometimes be printed as a hardcopy. For example, a conference may print its web pages about the conference schedule and distribute them to the attendees. In addition, a web page containing a map of the conference site may be printed and displayed on a poster. Once it is printed, the printed web pages lose their control information and cannot be navigated.

Figure 1:
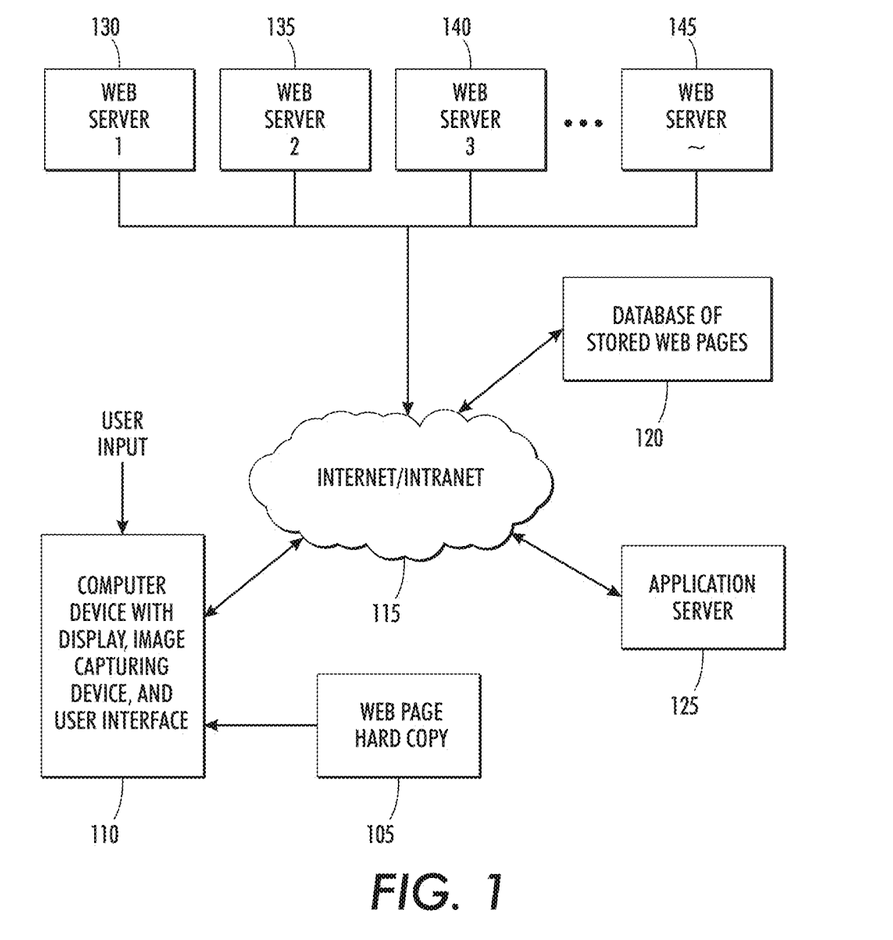
FIG. 1 is a block diagram of a system for navigating a hard copy of a web page according to an exemplary embodiment of this disclosure.

With reference to FIG. 1, shown is a block diagram of an exemplary system to facilitate the operation of a method of navigating a hard copy of a web page.

The system includes a computer device 110 with a display, an image capturing device and a UI, for example, a mobile internet device such as a smart phone, laptop computer, etc. The computer device 110 is configured to capture an image of a web page hard copy 105. Other components of the system include an application server 125, database of stored web pages 120, a plurality of web servers 130, 135, 140 and 145, as well as an internet/intranet 115 which provides communications to and from the system components.

The application server 125 is configured to execute the computer instructions necessary to process a captured image of a hard copy of a web page, perform searching of the database 120 for a web page associated with the captured image, perform scene generation and communicating the generated scene to the computer device 110 for display to a user.

Below is provided further detail of the disclosed method and system. As stated above, the system includes five parts: a database that stores web page information, a digital camera that captures images, a search engine that retrieves the web information, a scene generation engine that produces artificial scenes simulating the experience of surfing the web, and a user interface that interacts with users. The database contains information for many web pages, including their controls (links, etc.) and text appearing in each page. According to one exemplary embodiment, the database is established and updated by crawling the web or a subset of the web. When images of a hardcopy are captured by a camera, the search engine searches the database and retrieves the web page associated with the hardcopy. Using the information retrieved from the web page, the scene generation engine is able to create artificial scenes that simulate web navigation experience according to a user's commands.

To navigate a hard copy of the web page a user points his/her camera towards the hardcopy of a web page, the system retrieves the web control information and creates simulated scenes according to user's action. For example, if the user presses his/her finger (cursor) on a link in the hardcopy image located on the camera screen, the link becomes underlined or changes color. If the user further activates the link, the web page associated with the link appears on the screen.

The user has the option to control how the new web page is presented. Option A is to have the associated web page appear in the device's native browser. Option B is to have the page rendered as if it existed in the real world (same zoom, angle of view, white point, etc. as that of the captured image of the web page) In terms of usability, Option A is the suggested default.

The web search mainly relies on OCR (Optical Character Recognition). The search engine first performs OCR on the captured image of the web page hard copy, and then searches in the database using the OCR results as keywords. The web page stored in the database, whose text matches the keywords with a certain degree of confidence, is considered to be the hit, and its HTML contents are retrieved. Ambiguity may exist that more than one stored web page matches the keywords, particularly in the cases when captured image contains only a small portion of the text. Additional information from the captured image, such as picture and graphics, the relative positions of the text, can be used for selecting the right hit. The system can also suggest via a UI that the user zoom out to capture a larger portion of the web page. Alternatively, if the captured image is too low in resolution, which may result in low OCR accuracy, the system can suggest that the user zoom in.

Figure 2:
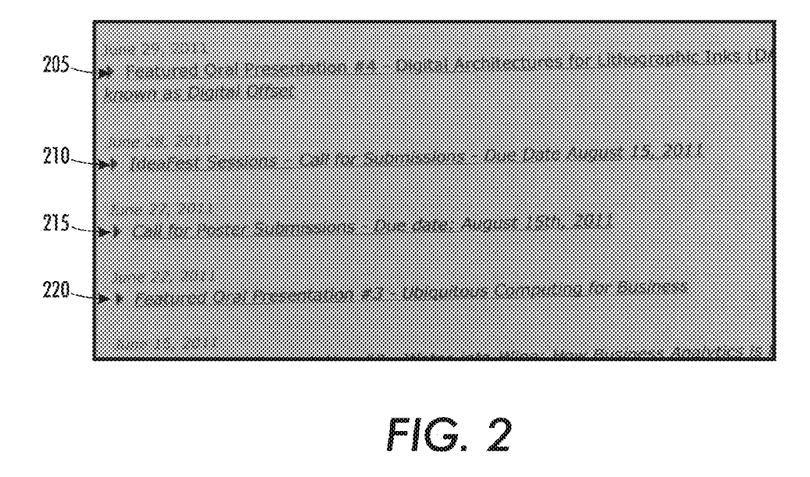
FIG. 2 illustrates a captured image associated with a hard copy of a web page according to an exemplary embodiment of this disclosure.
Figure 3:
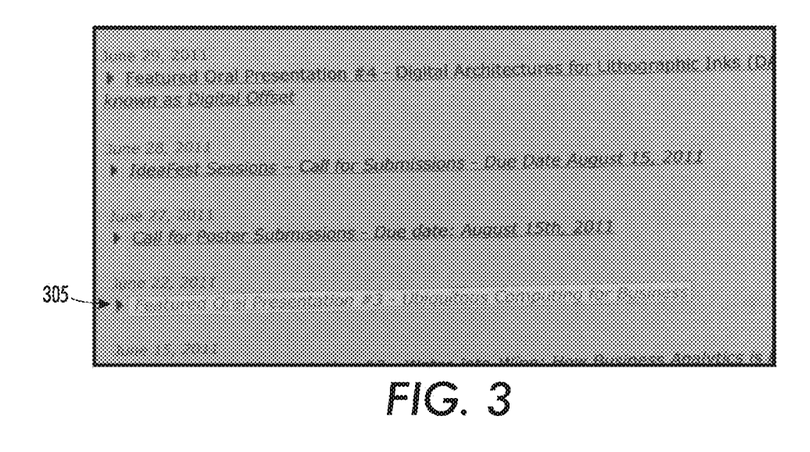
FIG. 3 illustrates the captured image of FIG. 2 with highlighted text associated with linked web pages according to an exemplary embodiment of this disclosure.
Figure 4:
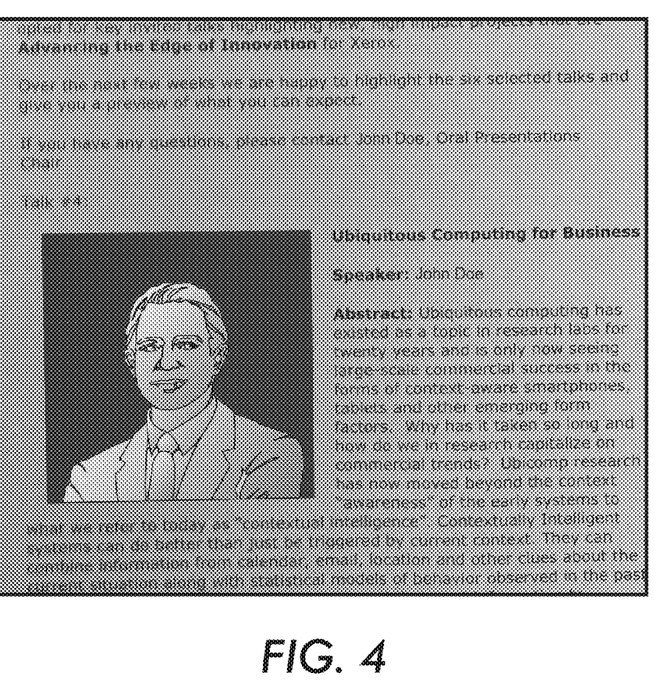
FIG. 4 illustrates a retrieved web page associated with the highlighted text of FIG. 3 according to an exemplary embodiment of this disclosure.

The scene generation engine works in two modes: 1) augmenting/modifying a captured scene; and 2) creating a new scene. In the first mode, the screen displays the scene of the web page hard copy captured, possibly with a portion of it being modified. For example, FIG. 2) shows a cropped portion of a captured scene, and in FIG. 3), the link "Featured Oral Presentation #3—Ubiquitous Computing for Business" changes its color on the screen as a pointing finger moves over it (note: finger not shown). The second mode is used when an entire scene needs to be artificially generated, for example in the cases when a user navigates to a new web page. In both modes, it is preferable that a scene, or the modification of the scene, is generated in a natural manner. In the first mode, the modifications produced are consistent with its surroundings in shape, dimension, color, and other imaging attributes. This is achieved by analyzing the shape, dimension, color, and other imaging attributes in the captured scene and generating the modified scene with similar imaging attributes. For example, in FIG. 2 the text lines 205, 210, 215 and 220 are slightly skewed, the scene generation engine applies the same skew in creating the highlighted area 305 in FIG. 3. In the second mode, a user has the option to control how a new web page is presented. Option A is to have the associated web page appear in the device's native browser. Option B is to have the page rendered as if it existed in the real world, i.e. same zoom, angle of view, white point, etc. An example of Option B is shown in FIG. 4. In terms of usability, Option A is the suggested default.

According to one exemplary embodiment, mode 1 is implemented in a similar fashion as a web browser. Mode 1 creates a table that lists all the user inputs, the actions the system should take associated with these actions, and the information needed to take the action. For example, all the web links in the page are listed and for each link, it records its associated text, and the parallelogram bounding the text. If the text occupies more than one line, multiple parallelograms bounding the text are recorded. If a pointing finger moves over the text associated with a link, the system will highlight the text by: 1) finding in the table the parallelogram(s) bounding the text; and 2) changing the text color and background color in the parallelogram(s).

To summarize, an augmented reality method and system for navigating hardcopies of web pages is provided, which includes:

Establishing a database of the web pages, including their control information and text on the page;

Capturing an image of the hardcopy of a webpage;

Performing segmentation and OCR on the captured image;

Searching the database using the OCR results for the segmented images;

Retrieving the information of the web page from the searching results; and

Creating artificial scenes that simulates web navigation experience using retrieved web information.

Figure 5:
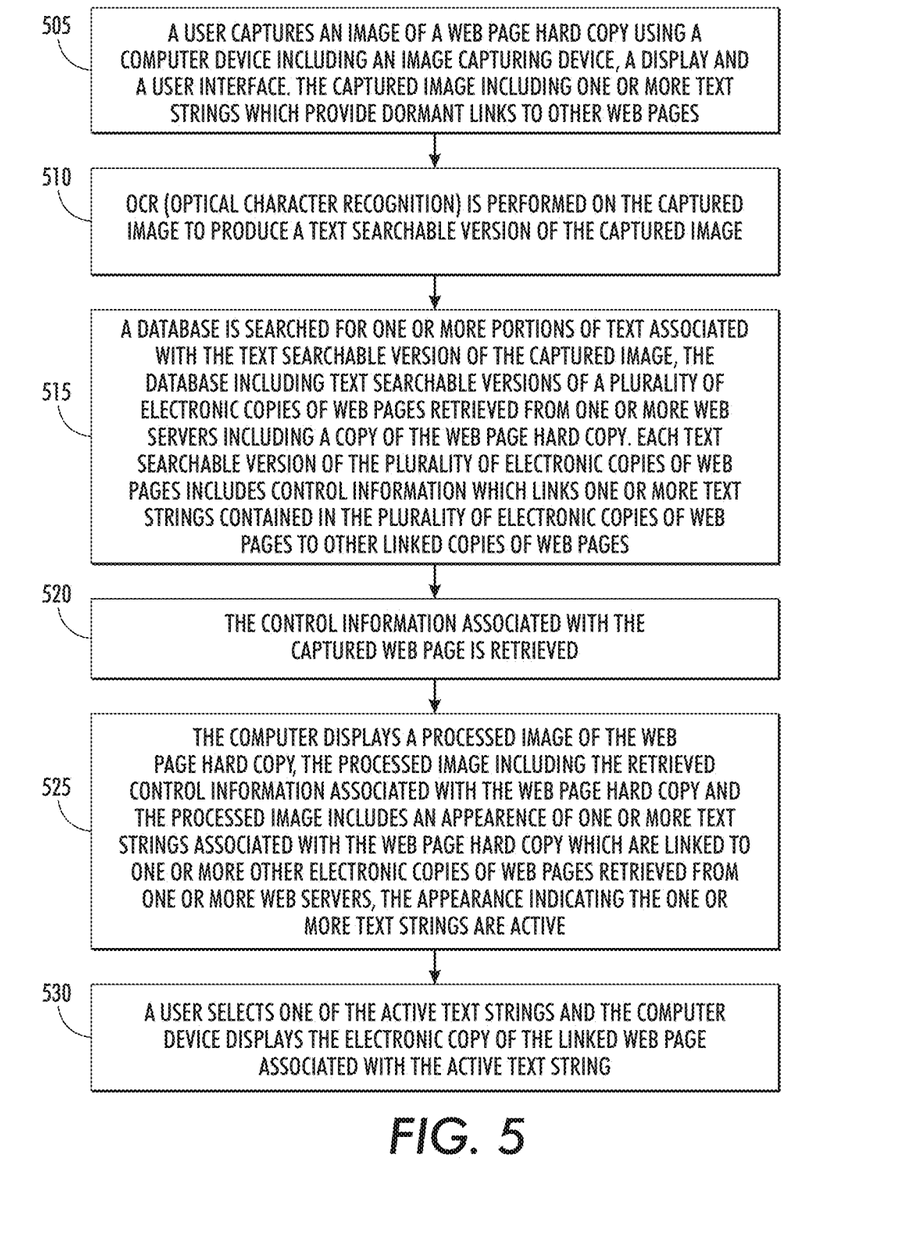
FIG. 5 is a flow chart of a computer-implemented method of navigating a web page according to an exemplary embodiment of this disclosure.

FIG. 5 is a flow chart of an exemplary method of navigating a hard copy of a web page as described herein.

Initially 505, a user captures an image of a web page hard copy using a computer device including an image capturing device, a display and a user interface, the captured image including one or more text strings which provide dormant links to other web pages.

Then 510, OCR (optical character recognition) is performed on the captured image to produce a text searchable version of the captured image.

Then 515, a database is searched for one or more portions of text associated with the text searchable version of the captured image, the database including text searchable versions of a plurality of electronic copies of web pages retrieved from one or more web servers including a copy of the web page hard copy. Each text searchable version of the plurality of electronic copies of web pages includes control information which links one or more text strings contained in the plurality of electronic copies of web pages to other linked copies of web pages;

Then 520, the control information associated with the captured web page is retrieved.

Then 525, the computer displays a processed image of the web page hard copy, the processed image including the retrieved control information associated with the web page hard copy and the processed image includes an appearance of one or more text strings associated with the web page hard copy which are linked to one or more other electronic copies of web pages retrieved from one or more web servers, the appearance indicating the one or more text strings are active.

Then 530, a user selects one of the active text strings and the computer device displays the electronic copy of the linked web page associated with the active text string.

Figure 6:
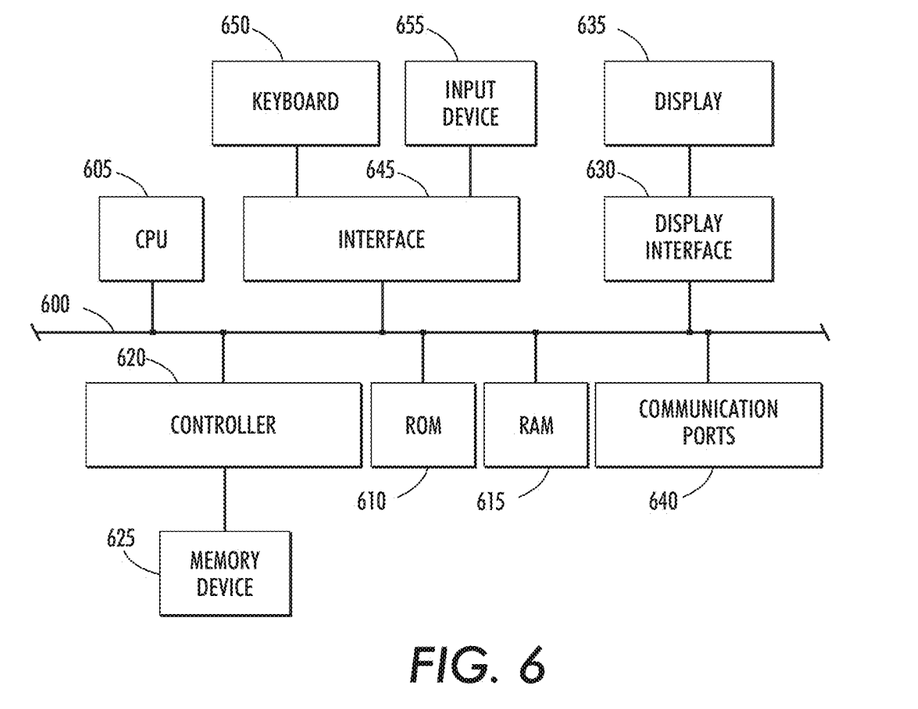
FIG. 6 is a block diagram of exemplary internal hardware associated with a computer, server, etc. that may be used to implement program instructions.

FIG. 6 depicts a block diagram of exemplary internal hardware that may be used to contain or implement program instructions, such as the process steps discussed above in reference to FIG. 5, according to exemplary embodiments. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an exemplary processing device, computing device or processor as such terms are used within this disclosure. Read only memory (ROM) 610 and random access memory (RAM) 615 constitute exemplary memory devices (i.e., processor-readable non-transitory storage media).

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 630 may permit information from the bus 600 to be displayed on the display 635 in audio, visual, graphic or alphanumeric format. Communication with external devices, such as a print device, may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated herein, and described throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of navigating a hard copy of a web page comprising:
   A) capturing an image of a physically displayed web page hard copy using a mobile hand held image capturing device including a camera, a display and a user interface, an alignment of the mobile hand held image capturing device and the captured image horizontally and/or vertically skewed relative to a displayed angle of view associated with the physically displayed web page, and the captured image including one or more text strings which provide dormant links to other web pages;
   B) performing OCR (optical character recognition) on the captured image to produce a text searchable version of the captured image;
   C) searching a database for an electronic copy of a web page matching the web page hardcopy by searching the database for one or more portions of text associated with the text searchable version of the captured image, the database including text searchable versions of a plurality of electronic copies of web pages retrieved from one or more web servers including the electronic a copy of the web page hard copy, each text searchable version of the plurality of electronic copies of web pages including control information which links one or more text strings contained in the plurality of electronic copies of web pages to other linked copies of web pages;
   D) identifying the matching electronic copy of the web page hard copy;
   E) retrieving the control information associated with the captured web page hard copy from the matching electronic copy of the web page hard copy; and
   F) generating and displaying on the mobile handheld image capturing device display a processed image of the matching electronic copy of the web page hard copy horizontally and vertically aligned to the display substantially equivalent to the captured image alignment horizontally and/or vertically skewed relative to the displayed angle of view associated with the physically displayed web page, the processed image including the retrieved control information associated with the matching electronic copy of the web page hard copy and the processed image including a modified appearance of the one or more text strings associated with the web page hard copy which are linked to one or more other electronic copies of web pages retrieved from the one or more web servers, the modified appearance indicating the one or more text strings are active and the modified appearance of the text strings at substantially the same angle as the captured image horizontally and/or vertically skewed relative to the displayed angle of view associated with the physically displayed web page.

2. The computer-implemented method of navigating a hard copy of a web page according to claim 1, further comprising:
   a user selecting one of the active text strings and the mobile handheld image capturing device displaying the electronic copy of the linked web page associated with the active text string.

3. The computer-implemented method of navigating a web page hard copy according to claim 1, wherein the mobile hand held image capturing device is one of a smart phone, mobile computing device, and laptop computer.

4. The computer-implemented method of navigating a web page hard copy according to claim 1, wherein step E) displays the processed image of the web page hard copy using a native browser associated with the mobile hand held image capturing device.

5. The computer-implemented method of navigating a web page hard copy according to claim 1, wherein step E) displays an augmented image including the retrieved control information associated with the matching electronic copy of web page hard copy, and the augmented image includes an overlay on the captured image which modifies the appearance of one or more text strings associated with the web page hard copy which are linked to one or more other electronic copies of web pages retrieved from one or more web servers, the modified appearance indicating the one or more text strings are active.

6. The computer-implemented method of navigating a web page hard copy according to claim 1, further comprising:
   a user selecting one of the active text strings and the mobile hand held image capturing device display displaying the electronic copy of the linked web page associated with the active text string; and
   the user selecting a second active text string associated with the electronic copy of the linked web page and the mobile hand held image capturing device display displaying an electronic copy of the linked web page associated with the second active text string.

7. A web page hard copy navigation system comprising:
   a mobile hand held image capturing device including a camera, a display and a user interface, the mobile hand held image capturing device configured to capture an image of a physically displayed web page hard copy containing one or more dormant links to other web pages, an alignment of the mobile hand held image capturing device and the captured image horizontally and/or vertically skewed relative to a displayed angle of view associated with the physically displayed web page;

a database operatively connected to the mobile hand held image capturing device, the database configured to store a plurality of web page electronic copies retrieved from one or more web servers, the plurality of web page electronic copies including control information which links text strings contained in the web page electronic copies to other web page electronic copies;

a server operatively connected to the mobile hand held image capturing device and the database, the server configured to search the database for a matching electronic copy of the captured image of the web page hard copy, retrieve the electronic copy of the web page hard copy associated with the captured image including any control information, and communicating the retrieved electronic copy of the web page hard copy associated with the captured image to the mobile hand held image capturing device, the communicated retrieved electronic copy including a processed image of the web page hard copy aligned substantially equivalent to the captured image alignment which is horizontally and/or vertically skewed relative to the displayed angle of view associated with the physically displayed web page, the processed image including the retrieved control information associated with the retrieved electronic copy of the web page hard copy, and the processed image including an overlay on the captured image which modifies an appearance of one or more text strings associated with the web page hard copy which are linked to one or more other electronic copies of web pages indicating the one or more text strings are active.

8. The web page hard copy navigation system according to claim 7, wherein the system is configured to receive a user selection via the UI indicating a selection of one of the active text strings and display the electronic copy of the linked web page associated with the active text string.

9. The web page hard copy navigation system according to claim 7, wherein the mobile hand held image capturing device is one of a smart phone, mobile computing device, and laptop computer.

10. The web page hard copy navigation system according to claim 7, wherein the system is configured to display the processed image of the web page hard copy using a native browser associated with the mobile hand held image capturing device.

11. The web page hard copy navigation system according to claim 7, wherein the system is configured to display an augmented image including the retrieved control information associated with the web page hard copy, and the augmented image includes an overlay on the captured image which modifies an appearance of one or more text strings associated with the web page hard copy which are linked to one or more other electronic copies of web pages retrieved from one or more web servers, the modified appearance indicating the one or more text strings are active.

12. The web page hard copy navigation system according to claim 7, wherein the system is configured to receive a user selection via the user interface indicating a selection of one of the active text strings, display the electronic copy of the linked web page associated with the active text string, receive a second user selection of a second active text string associated with the electronic copy of the linked web page, and display an electronic copy of the linked web page associated with the second active text string.

13. A computer program product comprising:
a non-transitory computer-usable data carrier storing instructions that, when executed by a computer, cause the computer to perform a method comprising:

A) capturing an image of a physically displayed web page hard copy using a mobile hand held image capturing device including a camera, a display and a user interface, an alignment of the mobile hand held image capturing device and the captured image horizontally and/or vertically skewed relative to a displayed angle of view associated with the physically displayed web page, and the captured image including one or more text strings which provide dormant links to other web pages;

B) performing OCR (optical character recognition) on the captured image to produce a text searchable version of the captured image;

C) searching a database for an electronic copy of a web page matching the web page hardcopy by searching the database for one or more portions of text associated with the text searchable version of the captured image, the database including text searchable versions of a plurality of electronic copies of web pages retrieved from one or more web servers including the electronic a copy of the web page hard copy, each text searchable version of the plurality of electronic copies of web pages including control information which links one or more text strings contained in the plurality of electronic copies of web pages to other linked copies of web pages;

identifying the matching electronic copy of the web page hard copy;

E) retrieving the control information associated with the captured web page hard copy from the matching electronic copy of the web page hard copy; and F) generating and displaying on the mobile handheld image capturing device display a processed image of the matching electronic copy of the web page hard copy horizontally and vertically aligned to the display substantially equivalent to the captured image alignment horizontally and/or vertically skewed relative to the displayed angle of view associated with the physically displayed web page, the processed image including the retrieved control information associated with the matching electronic copy of the web page hard copy and the processed image including a modified appearance of the one or more text strings associated with the web page hard copy which are linked to one or more other electronic copies of web pages retrieved from the one or more web servers, the modified appearance indicating the one or more text strings are active and the modified appearance of the text strings at substantially the same angle as the captured image horizontally and/or vertically skewed relative to the displayed angle of view associated with the physically displayed web page.

14. The computer program product according to claim 13, the method further comprising:
receiving a user selection of one of the active text strings and displaying the electronic copy of the linked web page associated with the active text string.

15. The computer program product according to claim 13, wherein the mobile hand held image capturing device is one of a smart phone, mobile computing device, and laptop computer.

16. The computer program product according to claim 13, wherein step E) displays the processed image of the web page hard copy using a native browser associated with the mobile hand held image capturing device.

17. The computer program product according to claim 13, wherein step E) displays an augmented image including the retrieved control information associated with the matching electronic copy of the web page hard copy, and the augmented image includes an overlay on the captured image which modifies the appearance of one or more text strings associated with the web page hard copy which are linked to one or more other electronic copies of web pages retrieved from one or more web servers, the modified appearance indicating the one or more text strings are active.

18. The computer program product according to claim 13, the method further comprising:
- a user selecting one of the active text strings and the mobile hand held image capturing device display displaying the electronic copy of the linked web page associated with the active text string; and
- the user selecting a second active text string associated with the electronic copy of the linked web page and the mobile hand held image capturing device display displaying an electronic copy of the linked web page associated with the second active text string.

* * * * *